(12) United States Patent  (10) Patent No.: US 8,590,374 B2
Thompson et al.  (45) Date of Patent: Nov. 26, 2013

(54) METHOD FOR MOUNTING A CAPACITIVE LEVEL SENSOR IN A LIQUID TANK

(75) Inventors: James Edward Thompson, Novi, MI (US); Russell Sarquis, Troy, MI (US); Damon Upton, Ray, MI (US)

(73) Assignee: Inergy Automotive Systems Research (Société Anonyme), Brussels (BE)

( * ) Notice: Subject to any disclaimer, the term of this patent is extended or adjusted under 35 U.S.C. 154(b) by 324 days.

(21) Appl. No.: 12/668,395

(22) PCT Filed: Jul. 8, 2008

(86) PCT No.: PCT/EP2008/058831
§ 371 (c)(1),
(2), (4) Date: Jan. 8, 2010

(87) PCT Pub. No.: WO2009/010419
PCT Pub. Date: Jan. 22, 2009

(65) Prior Publication Data
US 2010/0186526 A1    Jul. 29, 2010

(30) Foreign Application Priority Data
Sep. 20, 2007  (EP) .................................... 07116867

(51) Int. Cl.
*G01F 23/26* (2006.01)
(52) U.S. Cl.
USPC ....................................... 73/304 C; 73/304 R
(58) Field of Classification Search
USPC .............................................. 73/304 C, 304 R
See application file for complete search history.

(56) References Cited

U.S. PATENT DOCUMENTS

| 4,296,630 | A |   | 10/1981 | Jung et al. |
| 4,566,322 | A | * | 1/1986 | Rau et al. ........................ 73/295 |
| 8,047,087 | B2 | * | 11/2011 | Massa et al. ................. 73/865.5 |

FOREIGN PATENT DOCUMENTS

| DE | 10027281 A1 | 1/2001 |
| EP | 0018467 A1 | 11/1980 |
| FR | 56249 E | 9/1952 |
| FR | 2666651 A1 | 3/1992 |
| GB | 2 046 918 A | 11/1980 |
| JP | 55-119018 A | 9/1980 |
| JP | 61-92759 U | 6/1986 |
| WO | WO 2006008308 A1 | 1/2006 |
| WO | WO 2006032672 A1 | 3/2006 |
| WO | WO 2006064013 A1 | 6/2006 |
| WO | WO 2007000454 A1 | 1/2007 |

OTHER PUBLICATIONS

Japanese Office Action Issued Jan. 22, 2013 in Patent Application No. 2010-515488 (English translation only).

* cited by examiner

*Primary Examiner* — Hezron E Williams
*Assistant Examiner* — Paul West
(74) *Attorney, Agent, or Firm* — Oblon, Spivak, McClelland, Maier & Neustadt, L.L.P.

(57) ABSTRACT

Method for mounting a capacitive level sensor inside a liquid tank having a bottom wall, the sensor having a foot and a measuring portion comprising at least one capacitive element supported by a rigid support extending from said foot, wherein the foot is fixedly secured to the bottom wall of the tank through a retainer, and according to which the rigid support forms an angle with the foot so that the length of the measuring portion of the sensor is higher than the height of the tank in the portion where the foot is located.

11 Claims, 1 Drawing Sheet

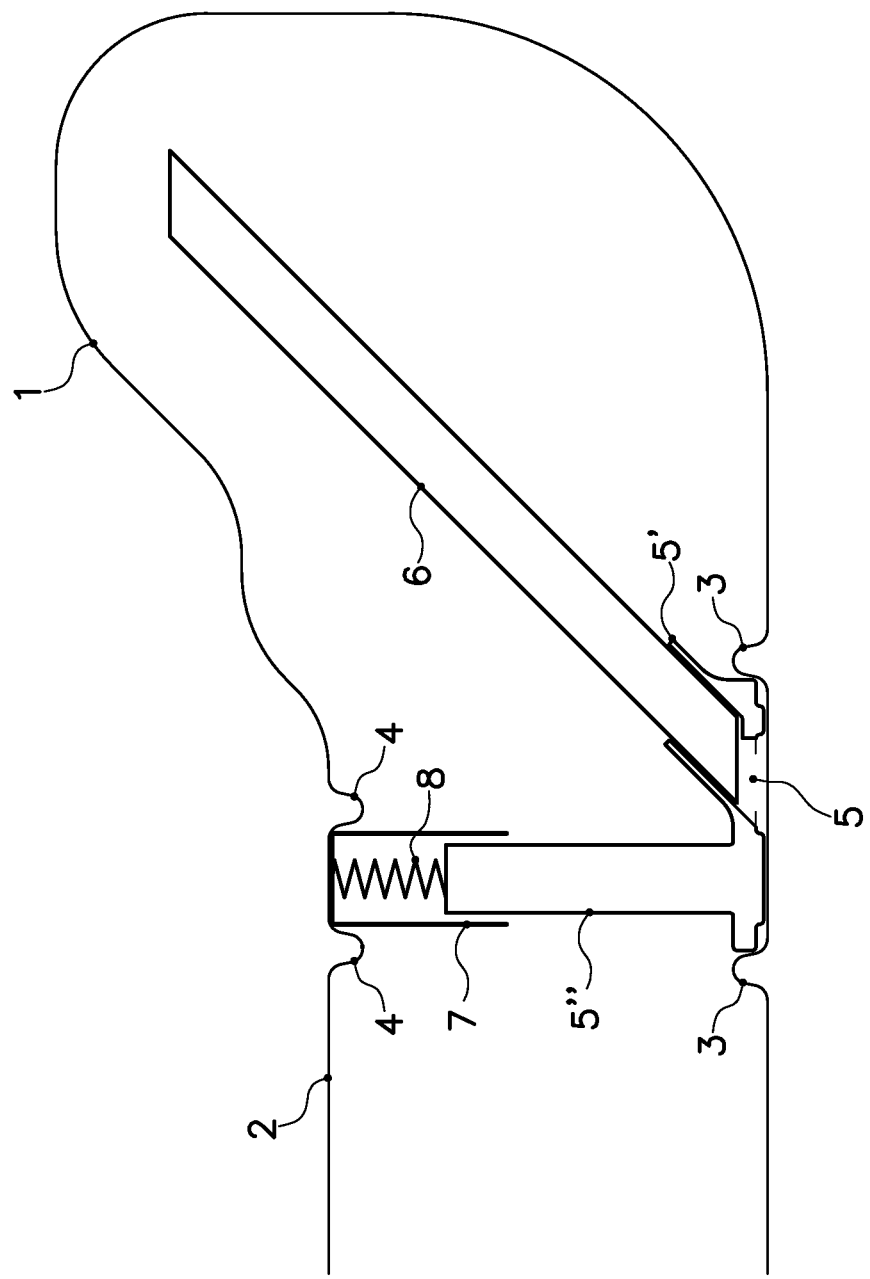

METHOD FOR MOUNTING A CAPACITIVE LEVEL SENSOR IN A LIQUID TANK

CROSS-REFERENCE TO RELATED APPLICATIONS

This application is a U.S. national stage application under 35 U.S.C. §371 of International Application No. PCT/EP2008/058831 filed Jul. 8, 2008, which claims priority to U.S. Provisional Patent Application No. 60/949,550 filed Jul. 13, 2007 and to European Patent Application No. 07116867.8 filed Sept. 20, 2007, these applications being incorporated herein by reference in their entirety for all purposes.

The present invention relates to a method for mounting a capacitive level sensor (gauge) into a liquid tank and more specifically: into a tank intended for a motor vehicle.

Typically automotive fuel systems use a rotary resistive fuel level sensor that is mounted directly to the fuel pump module to measure remaining fuel inside the tank.

The fuel tank is becoming more complex as many OEM's are packaging other components such as batteries, exhaust and driveline components around or through the fuel tank. A major advantage of a plastic fuel tank is it offers car manufacturers the ability to optimize and utilize available vehicle environment for fuel storage. However, because of this advancement many fuel systems are being designed with pump modules which are located below the full fuel level. This is known as a wet pump mounting. Wet mountings often inhibit the rotary fuel level sensor from sweeping to the full stop fuel level. Improving the measurement range requires a longer sensor float arm rod or an extension bracket to reposition or extend the sensor mounting off of the pump module. This can increase the difficulty of installing the pump module assembly inside the tank and can also decrease the accuracy of the measurement. Often it is not possible to reach the optimum sweep for the rotary fuel level sensor float arm even with an extension.

Other issues related to resistive rotary fuel level sensors are damage to the resistive circuit card due to aggressive fuels, limited resolution, and wear or damage of moving parts.

Because of these issues, car manufacturers prefer to have level sensors with no moving parts, not only for the fuel tanks by the way but also: for all the other containers which may be present on a motor vehicle (like a urea tank for SCR systems (Selective Catalytic Reduction of NOx in the exhaust gases) for instance.

An issue with some non-moving part level sensors is that they are not bottom referenced (meaning they cannot measure to the bottom, empty level of the tank) because they are usually only fixed to the top of the tank, and not to the bottom.

Some of the motionless level sensors or gauges comprise an electrical capacitor used for measurement and an electrical capacitor used for reference. The capacitor used for measurement is normally present over the entire height of the tank, and its capacitance varies according to the height of liquid in the tank. The capacitor used for reference is immersed in the liquid and supplies a reference value of the dielectric constant of the liquid. An appropriate electronic circuit determines the level of the liquid in the tank. The capacitors of these sensors can be flat or cylindrical plates between which the liquid can fall and rise and influence the capacitance by skin effect. Alternatively, they can be interdigitated (engaged comblike) electrodes which interact by interference effect; the latter are affixed to a substrate and look like printed circuits. Such electrodes can moreover be manufactured by manufacturing methods similar to those of printed circuits. They are therefore sometimes called PCB (Printed Circuit Board) gauges or sensors.

U.S. Pat. No. 4,296,630 discloses such capacitive sensors with interference effect comprising interdigitated electrodes obtained by eroding a metallic layer affixed to a ribbon-shaped flat and flexible substrate. These sensors preferably are put inside a protective casing (which may be a mere plastic tube) notably in order to avoid the effect of the waves. This document addresses the problem of bottom referencing by fixing the tube inclined to the top of the tank using a flexible hose and a spring forcing the lower end of the tube onto the bottom of the tank. The problem with such a system is however that the degree of inclination can vary with the deformation of the tank (owed to the weight of liquid inside of it, or to internal pressure or vacuum) so that the precision of the level measurement will be affected.

WO 2006/064013 to the applicant solves that problem by providing a very simple method for fixing a fuel level sensor (preferably a capacitive one) within a fuel tank having an upper and a lower wall, the sensor having a foot and a top, said method consisting in:

fixedly securing the foot of the sensor to the bottom wall of the fuel tank through a molded-in retainer; and elastically fixing the tubular top of the sensor to the top wall of the tank through a molded-in retainer as well.

This method is preferably applied to sensors which are inserted through the mounting flange of the fuel delivery module or to any other aperture through the tank wall. However, depending on the tank geometry, some areas far away from said flange and/or from any other mounting opening of the tank cannot be reached by this kind of sensor. Especially, if the fuel delivery module is fixed in a part of the tank where there is a recess in the upper wall, fuel levels above this recess (and hence, the full level range of the tank) cannot be measured by such a sensor.

The present invention aims at solving that problem by providing a method for mounting a capacitive sensor inside a liquid tank which allows measuring the liquid level with a high precision even in parts remote from the pump module mounting flange and/or impossible to reach by classical liquid sensors and/or where the liquid level may reach higher values that in the mounting portion.

To that end, the present invention relates to a method for mounting a capacitive level sensor inside a liquid tank having a bottom wall, the sensor having a foot and a measuring portion comprising at least one capacitive element supported by a rigid support extending from said foot, wherein the foot is fixedly secured to the bottom wall of the tank through a retainer, and according to which the rigid support forms a constant (fixed) angle with the foot so that the length of the measuring portion of the sensor is higher than the height of the tank in the portion where the foot is located.

The fact of having the measuring portion of the sensor positioned with a given angle in the tank (guaranteed by the rigidity of the support and the rigid fixture of the foot) makes it possible to obtain a linear signal according to the level of liquid to be measured and this with a high precision. It also allows reaching locations (like pockets in saddle tanks) of the tank having a height which is more important than the height in the location where the sensor is fixed (i.e. the distance between the bottom and a top wall of the tank at the very place where the foot of the sensor is fixed). Accordingly, the angle the support makes with the foot of the sensor and the length of said support (and which is preferably comprised between 125 and 400 mm) is conditioned by the tank geometry.

By "constant angle" is meant in fact an angle which remains unchanged during the life time of the tank. This angle is generally comprised between 45 and 90°.

The present invention can be applied to all tanks on board of a vehicle since their geometry is often complicated owed to the place available under the hood, so that they often possess a recess as mentioned above. This is more often the case with fuel tanks and urea reservoirs, especially with fuel tanks in fact.

Within the frame of the invention, "fuel tank" is intended to mean any type of tank capable of storing a liquid and/or gaseous fuel under varied pressure and temperature conditions inside a motor vehicle. The term "motor vehicle" is intended to include not only cars but also motorcycles and lorries (or trucks).

The tank may be made of metal or of plastic. The method according to the invention is well suited to a liquid tank made of plastic.

"Plastic" is intended to mean any material comprising at least one synthetic resin polymer.

All types of plastic may be suitable. Particularly suitable plastics belong to the category of thermoplastics.

"Thermoplastic" means any thermoplastic polymer, including thermoplastic elastomers and blends thereof. The term "polymer" denotes not only homopolymers but also copolymers (binary or ternary copolymers in particular). Examples of such copolymers are, with no restriction being implied, random copolymers, linear and other block copolymers and graft copolymers.

Any type of thermoplastic polymer or copolymer whose melting point is below the decomposition temperature is suitable. Synthetic thermoplastics that have a melting range spread over at least 10 degrees Celsius are particularly suitable. Examples of such materials are those that have a polydispersity of their molecular mass.

In particular, use may be made of polyolefins, polyvinyl halides, thermoplastic polyesters, polyketones, polyamides and copolymers thereof. A blend of polymers or copolymers may also be used, as may a mixture of polymeric materials with inorganic, organic and/or natural fillers such as, for example, but with no restriction being implied, carbon, salts and other inorganic derivatives, and natural or polymeric fibres. It is also possible to use multi-layer structures consisting of stacked, integral layers comprising at least one of the polymers or copolymers described above.

A multilayer structure based on external layers of high density polyethylene (HDPE) and an internal layer of a barrier polymer like ethylene vinyl alcohol copolymers (EVOH), gives good results in the case of fuel tanks.

The liquid level sensors concerned by this application are non-moving part sensors based on a continuous capacitance measurement. There are many types of capacitive liquid sensors. However, by definition, they all comprise at least one capacitive element. Preferably, this element consists in "interdigitated" electrodes i.e. electrodes having the form of coils with loops in the form of digits engaged comb-like with each other and printed on a flexible insulating support, as described in the abovementioned US patent. Preferably, these digits extend vertically, along their insulating support.

Advantageously, and as described in the abovementioned US patent, the sensor according to the invention comprise a pair of interdigitated measurement electrodes and a pair of reference electrodes, also interdigitated. The latter is preferably located at the lower end of the support or in the foot of the sensor so as to ensure its constant immersion in the liquid present in the tank. It makes it possible to disregard variations of temperature, pressure, nature of the liquid, and other interference factors likely to disturb the measurement. Preferably, the electronics are connected to the sensor (either welded to it or fixed via a connector) or even; they preferably are integrated on the same PCB (Printed Circuit Board).

According to the invention, the capacitive element has a foot and it is supported by a rigid support. The foot and the rigid support may be molded as one piece. However, preferably, they are separate pieces. Even more preferably, they are both plastic pieces and the foot (which may have a rather complicated shape) is preferably injection molded while the rigid support may be extruded.

Preferably, this support is a hollow structure inside of which the flexible insulating support of the electrode(s) is inserted. A mere hollow plastic tube can act as rigid support according to the invention. Preferably, this plastic tube is inserted in a hollow cylindrical part molded in one piece with the foot and which is inclined.

In the case of a tube or any other closed wall structure acting as rigid support, said structure must be able to be filled with liquid. This may be obtained by merely providing openings (holes) preferably at its bottom. Since air circulation is preferably insured for better hydraulic function, it is advantageous to have a hole at the top of the sensor as well. However, the size of these holes is preferably tuned to create a filter on liquid movements.

In addition to the hollow cylindrical part, the foot may have a hole in the bottom to allow fuel (or urea for SCR applications, or any other automotive liquid) to make its way into the rigid support. Similarly, the retainer does preferably not completely surround the foot, but instead there is a channel to allow liquid to fill this area and make its way into the hole through the bottom of the foot and finally, into the rigid support to reach the sensor.

Preferably, the foot of the sensor and the rigid support are made of a plastic (preferably a polyacetal) which offers electrostatic shielding for instance a carbon black charged one.

In order to insure the above mentioned bottom referencing, the retainer preferably has its bottom in continuity with (in the same plane as) the tank wall. According to a preferred embodiment of the invention, the liquid tank has a plastic (preferably thermoplastic has defined above) wall and the retainer for mounting the foot of the sensor is molded in one piece with said tank wall.

The foot to which the rigid support is fixed or integrated preferably has a shape mating (corresponding to) the shape of the retainer where it is fixed. Alternatively or additionally, the retainer may be provided with means (like clips, dove tails . . . ) allowing the foot to be fixed there by sliding or by a "snap fit" or "quick connection".

According to a preferred embodiment of the invention, the foot of the sensor comprises a hollow cylindrical extension which acts as mechanical fixing rod and which is elastically fixed to the top wall of the tank, preferably right above the place where the foot is firmly fixed. This upper wall preferably has a retainer as well, which is preferably molded-in as well. This retainer preferably either comprises directly a part (preferably hollow) in which the top of the rod can move, or has a shape suitable for receiving such a part. By the terms "elastically fixed" and "move" is meant in fact that the top of the rod can slide vertically in order to accommodate for the liquid tank deformation during aging.

In an alternative, the mechanical rod can be a part separate from the foot and inserted into an extension of it (pref. cylindrical).

Preferably, there is an intermediate part between the top of the rod and the retainer. According to a preferred embodiment, which is quite simple, the intermediate part has the shape of a hollow cylinder in which the upper end of the rod can slide. Preferably, the rod has the shape of a post and a spring is inserted between said post and the intermediate part. Since leak tightness is not an issue, the clearances between the rod and the intermediate part are preferably designed so that they do not bind up which could limit vertical travel.

Preferably, foot/sensor/post/intermediate piece/spring constitute a pre-assembly which is inserted into the tank by compressing the spring. After the assembly has been fixed into the tank, the spring is uncompressed and the top part of the rod slides into the top tank feature (hollow cylinder), thus preventing the assembly to become dislodged. This will also keep force on the assembly to make sure the sensor is always very close to the bottom of the tank. This design also allows the assembly to be removed in the case that the sensor needs to be serviced over the life of the vehicle.

As already stated, the retainer(s) is/are preferably in one piece with the tank wall. They are most preferably formed while molding the tank itself, either with inserts in the mold (which give the tank wall an appropriate shape) or by encapsulating inserts. They could however also be separate features which are welded (or otherwise fixed) onto the inside tanks shell, preferably also during the manufacturing of the tank, preferably using the TSBM process described hereafter.

According to a preferred embodiment of the invention, the liquid tank comprises a fuel delivery module inserted through an opening in its wall (generally closed off by a flange) and the sensor is inserted in the tank (for installation/mounting) through said opening.

Alternatively, it could be fixed during the tank molding itself, for instance by using a mould with a core (internal placement mechanism) or a robot in order to first mould or fix the retainer(s) and then, fix the sensor. Such a process, which allows the formation or fixation of the retainers and/or the fixing of the sensor, preferably uses parisons (or extruded performs) in two pieces, as described in earlier applications WO 2006/008308, WO 2006/032672 and WO 2007/000454 to the applicant, the content of which in that regard being incorporated by reference in the present application. This process is generically called "TSBM" process or Twin Sheet Blow Molding.

FIG. 1 illustrates some preferred embodiments of the present invention and is hence not to be construed as limiting its scope.

It shows a cut through a fuel tank (1) comprising a recess (2) where a capacitive sensor (6) is fixed using 2 retainers: one (3) molded in one piece with the bottom wall of the tank (1) and one (4) molded in one piece with the top wall of the tank (1).

The sensor (6) comprises a PCB type sensor (as defined above) which is inserted into a plastic tube acting as rigid support according to the invention. This support is inserted into a cylindrical hollow part (5') integrated (molded in one piece) with the foot (5) of the sensor (6) and which comprises a hole for admitting fuel and which also integrates a cylindrical hollow extension (5") acting as mechanical fixation rod or post.

The foot (5, 5', 5") of the sensor (6) is inserted into the lower retainer (3), while the upper retainer (4) receives an intermediate part (7) in the shape of a hollow cylindrical part into which the upper part of the rod (5") can slide. A spring (8) is inserted between the top of said rod (5") and the intermediate part (7).

As explained earlier, the foot (5, 5', 5")/sensor (6)/intermediate piece (7)/spring (8) assembly is inserted into the tank (1) through an opening (not shown) intended for the mounting of a fuel delivery module (not shown either, but located close to the left of the assembly), by compressing the spring (8) during fixation and relieving it when the assembly is in place.

The advantages of the illustrated system are:

as far as its measurement capability is concerned: high linearity of measure; high precision of fuel level measure (error <1% typically); ability to measure low levels (typically down to 2 mm); no hysteresis; level to volume conversion done in a programmable table, easily adapted to format of fuel tank; measure does not depend of fuel type compared with standard capacitive measurement as far as the architecture is concerned: flexible component for any fuel system architecture (adaptable support length); can be integrated in a TSBM process.

The invention claimed is:

1. A method for mounting a capacitive level sensor inside a liquid tank having a bottom wall, the sensor having a foot and a measuring portion including at least one capacitive element supported by a rigid support extending from said foot, the method comprising:

fixedly securing the foot to the bottom wall of the tank through a retainer, and according to which the rigid support forms a constant (fixed) angle with the foot and thus the measuring portion of the sensor is positioned with the constant (fixed) angle in the tank and without contacting a top wall of the tank, wherein the constant (fixed) angle remains unchanged during a life time of the tank, and specifically does not vary with a deformation of the tank, so that a length of the measuring portion of the sensor is higher than a height of the tank in a portion where the foot is located.

2. The method according to claim 1, wherein the sensor comprises a pair of interdigitated measurement electrodes and a pair of interdigitated reference electrodes which are printed on a flexible insulating support.

3. The method according to claim 2, wherein the rigid support is a hollow structure inside of which the flexible insulating support of the electrodes is inserted.

4. The method according to claim 3, wherein the hollow structure is a plastic tube inserted in a hollow cylindrical part molded in one piece with the foot and which is inclined.

5. The method according to claim 1, wherein the foot of the sensor comprises a hollow cylindrical extension which acts as a mechanical fixing rod which is elastically fixed to the top wall of the tank.

6. The method according to claim 5, wherein the top wall of the tank comprises a retainer and an intermediate part located between said retainer and the upper part (top) of the rod.

7. The method according to claim 6, wherein the intermediate part has the shape of a hollow cylinder in which the upper end of the rod can slide, wherein the rod has the shape of a post and wherein a spring is inserted between said post and the intermediate part.

8. The method according to claim 1, in which the liquid tank has a plastic wall, and wherein the retainer is formed while molding the tank itself, either using inserts in the mold or by encapsulating inserts.

9. The method according to claim 8, wherein the liquid tank comprises a liquid delivery module inserted through an opening in its wall, and wherein the sensor is inserted and fixed in the tank through said opening.

10. The method according to claim 1, wherein the sensor is fixed during the tank molding itself, by using a mould with a core or a robot in order to first mould or fix the retainer and then, fix the sensor.

11. The method according to claim 1, wherein the foot includes a generally "L" shaped cross section.

* * * * *